United States Patent
Chang et al.

(10) Patent No.: US 7,539,553 B2
(45) Date of Patent: May 26, 2009

(54) SYSTEM AND METHOD FOR AUTOMATED DISPATCH AND TRANSPORTATION OF WORK-IN-PROCESS

(75) Inventors: Yao-Hsiung Chang, Hsinchu (TW); Chien-Peng Ho, Fengshan (TW); Jau-Huang Chen, Taichung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1305 days.

(21) Appl. No.: 10/610,269

(22) Filed: Jun. 30, 2003

(65) Prior Publication Data
US 2004/0267641 A1     Dec. 30, 2004

(51) Int. Cl.
*G06F 19/00* (2006.01)
(52) U.S. Cl. .................... 700/121; 709/205
(58) Field of Classification Search ................ 700/97, 700/99–103, 108, 121; 709/205; 718/100; 705/8–10, 26–28; 438/5
See application file for complete search history.

(56) References Cited

U.S. PATENT DOCUMENTS

| | | | |
|---|---|---|---|
| 5,841,677 A * | 11/1998 | Yang et al. | 702/176 |
| 6,687,563 B1 * | 2/2004 | Wang et al. | 700/121 |
| 2003/0233161 A1 * | 12/2003 | Cheng et al. | 700/108 |
| 2004/0039469 A1 * | 2/2004 | Lin | 700/100 |
| 2005/0060212 A1 * | 3/2005 | Annamaneni et al. | 705/7 |

* cited by examiner

*Primary Examiner*—Kidest Bahta
(74) *Attorney, Agent, or Firm*—Thomas, Kayden, Horstemeyer & Risley

(57) ABSTRACT

A system and method for transporting wafer lots to desired destinations. The system includes a wafer lot status database unit, status storage, a filtering rule base, and a dispatch control unit. First, status records are input from the wafer lot status database by the dispatch control unit repeatedly for a predetermined period of time. Then, the dispatch control unit inputs a status tree and selects candidate wafer lots using the filtering rule and generates transport commands for candidate wafer lots to the transport unit. Finally, the transport unit transports the candidate wafer lots to the desired destination according to the transport commands.

31 Claims, 5 Drawing Sheets

| Wafer Lot Identity | Current Location | Current Status | Prior Status |
|---|---|---|---|
| 1 | A | waiting | lot hold release |
| 2 | A | waiting | bank hold release |
| 3 | A | waiting | location forward |
| 4 | A | waiting | in-process |
| 5 | A | waiting | holding |
| 6 | A | in-process | waiting |
| 7 | A | in-process | waiting |
| 8 | A | holding | waiting |
| 9 | A | completing | in-process |
| 10 | A | completing | in-process |

FIG. 2

SYSTEM AND METHOD FOR AUTOMATED DISPATCH AND TRANSPORTATION OF WORK-IN-PROCESS

BACKGROUND OF THE INVENTION

1. Field of the Invention

The present invention relates to automation systems, and more particularly, to a system and method of automated dispatch and transport of Work-In-Process (WIP) to desired destinations in manufacturing processes.

2. Description of the Related Art

Automated dispatch systems have been used in a variety of manufacturing environments, including semiconductor-manufacturing processes. These systems initiate personnel or automated transport systems to transport materials, such as wafer lots and banks, to desired destinations such as semiconductor fabrication equipment, metrology instruments, or stockers.

In a semiconductor manufacturing environment, many processing equipment installations share stockers. As is known, the stockers stock wafer lots or banks for subsequent processing. Wafer lots are continuously transported to various equipment and stockers, consuming much time. For example, fabrication of an IC chip entails various steps of deposition, cleaning, ion implantation, and etching, each of which must be performed by discrete processing equipment, i.e. a chemical vapor deposition chamber, an ion implantation chamber, an etcher, etc. Efficient an timely transportation of wafer lots or banks is very important in facilitating production.

Manual transportation operation in 12-inch fab facilities has been gradually replaced by automated systems due to the size and space requirements for the 12-inch wafers. Accurate transport of wafer slots and banks is an important aspect of fully automated manufacturing processes. Automated transport systems in manufacturing processes move materials from one site to desired destinations based on instructions from Manufacturing Execution System (MES). Wafer lots are typically input to the transport system using automated equipment which controls flow. Automated equipment is also used to remove wafer lots using the equipment loadport as the exit point, with the transport system and/or removal equipment designed to allow several wafer lots to accumulate near stockers while preventing collisions between adjacent wafer lots. In some applications, wafer lots must be temporarily moved from the transport system to a workstation at one or more locations along the transportation path. Wafer lots are later returned to the transport system, which then transports wafer lots to the next work station or the exit point.

In a conventional automated manufacturing process, a dispatch system is responsible for initiating the transport system or facility to transport materials or work-in-process (WIP) to the desired destination directly. Two dispatch rules (a tool dispatch rule and a lot dispatch rule) are commonly used to dispatch wafer lots. Using known algorithms, the tool dispatch rule determines the target stocker or the processing equipment for given wafer lots or banks, and the lot dispatch rule determines the target wafer lots for given equipment or stocker. These two dispatch rules both attend to many criteria such as priority, yield rate, load balancing, and stability.

Commonly, wafer lots and banks are ideally transported by automated transportation mechanisms to equipment or stockers for manufacturing equipment for an immediately subsequent operation or process step. Wafer lots typically require comprehensive inspection or correction between equipment or process steps due to the delicate nature of the integrated circuits (ICs). When inspection or correction occurs, they are not transported immediately, but instead are held for subsequent processing. Operators hold wafer lots or banks for inspection or correction and record the status thereof for lot hold release, locate forward, locate backward, operation branch or bank hold release in the Manufacturing Execution System (MES), depending on various events. After inspection or correction, wafer lots are released and their current status is recorded as waiting in the MES by operators. Automated transport systems are often associated with interruptions during the entire automated manufacturing process. One problem is that WIP may be abandoned in a stocker after inspection or correction without transport to a desired destination. A second and more serious problem is that transport system may take an unnecessarily long time to transport wafer lots or banks as described because they are isolated from equipment or the nearest stocker. This not only wastes time for transportation, but also decreases equipment utilization.

To address the situation described, operators may trigger transport commands to the dispatching system after inspection or correction. Although the solution is very simple, several problems remain. First, numerous simultaneous triggers may cause traffic conflicts in the transport system if they are not properly scheduled. For instance, when an operator releases a wafer bank containing one thousand lots, one thousand instant transport commands are triggered, potentially seizing the entire automated transport system and crowding other commands. Additionally, the ultimate goal of a fully automated light-out fab is compromised by the system's reliance on operator initiative to trigger transport commands.

In view of the limitations of conventional transport and the solutions described above, a need exists for a system and method of efficient material transport that effectively reduces the transport time and improves equipment utilization, and which also avoids traffic conflict.

SUMMARY OF THE INVENTION

It is therefore an object of the present invention to provide a system and method of automated dispatch and transport of WIP in a manufacturing process to reduce transport time and avoid traffic conflicts. To achieve this and other objects, the present invention provides a system and method of automated dispatch and transport of WIP to desired destinations within manufacturing environments.

According to one embodiment of the invention, a system includes a wafer lot status database, status storage, a filtering rule base and a dispatch control unit. The wafer lot status database stores status records comprising four fields, such as wafer lot identity, current location, current status, and prior status. Status storage includes a status tree to store a plurality of status types and each status category includes a plurality of status types. The filtering rule base stores filtering rules that select candidate wafer lots that are currently not in the desired destinations. The dispatch control unit selects candidate wafer lots using the filtering rule, finally initiating the transport system to transport candidate wafer lots to the desired destinations. The transport system receives transport commands from the dispatch control unit and transports candidate wafer lots to desired destinations.

According to another embodiment of the invention, a method for transporting wafer lots to the desired destinations performs the following steps. First, status records are input from the wafer lot status database by the dispatch control unit repeatedly for a period of time. Then, the dispatch control unit inputs the status tree. The status tree includes at least one interrupt category, including a plurality of status types. After that, the dispatch control unit selects candidate wafer lots using the filtering rule. The filtering rule determines whether the current status is waiting status and the prior status is in the interrupt category of each wafer lot. If so, the dispatch control unit generates transport commands for candidate wafer lots to the transport unit. Finally, the transport unit transports the candidate wafer lots to the desired destination according to the transport commands.

BRIEF DESCRIPTION OF THE DRAWINGS

The present invention can be more fully understood by reading the subsequent detailed description and examples with references made to the accompanying drawings, wherein:

FIG. 2 is a diagram of an exemplary wafer lot status record according to an embodiment of the present invention;

DETAILED DESCRIPTION OF THE INVENTION

Figure 1:
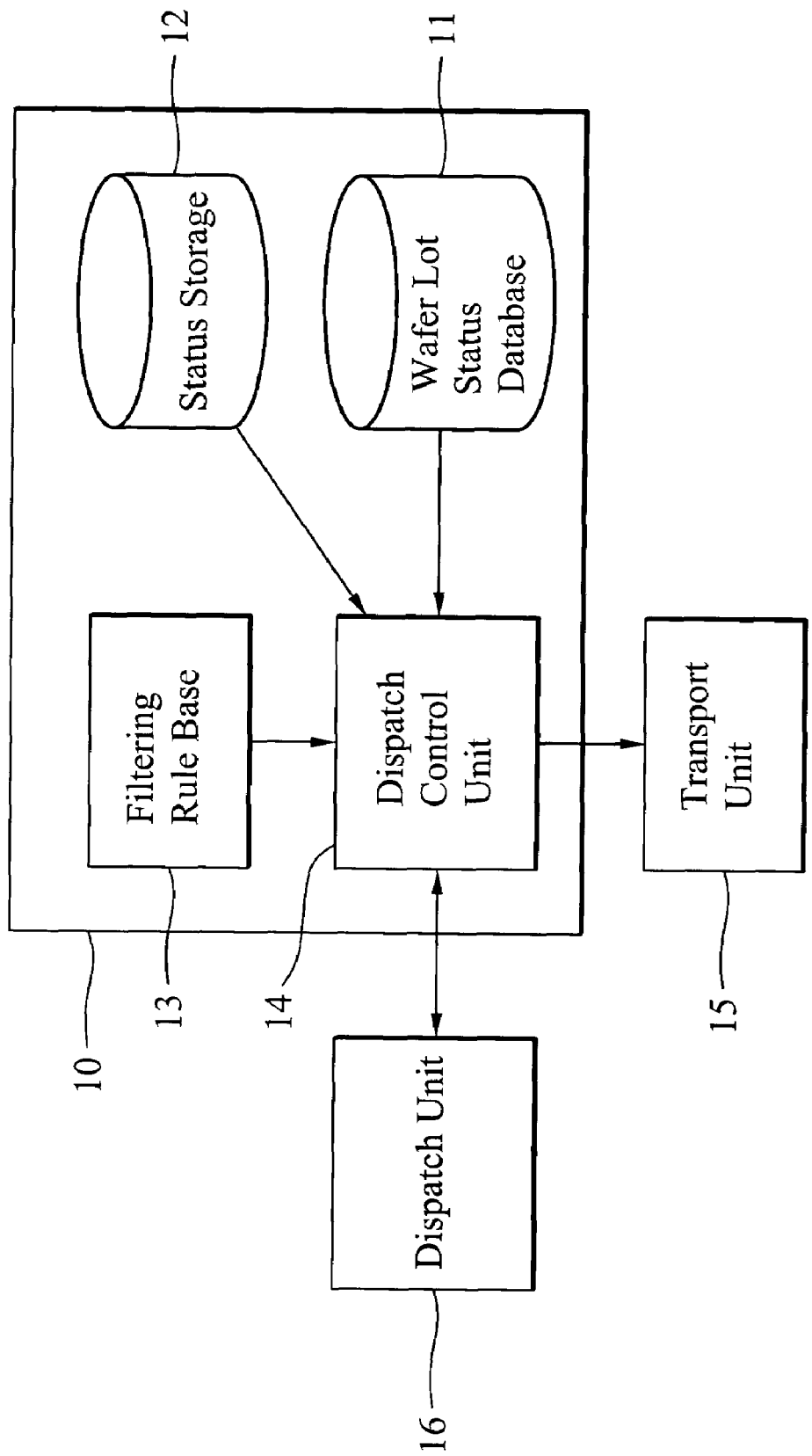
FIG. 1 is a diagram of the architecture of a system for automated dispatch and transport of wafer lots.

FIG. 1 is a diagram of the architecture of a system for automated dispatch and transport of wafer lots according to an embodiment of the present invention. The illustrated system includes the system 10 of an embodiment of the invention, a transport unit 15 and a dispatch unit 16. The system 10 includes a wafer lot status database unit 11, status storage 12, a filtering rule base 13, and a dispatch control unit 14.

The wafer lot status database 11 stores status records preferably comprising four fields, such as wafer lot identity, current location, current status, and prior status. Consistent with the scope and spirit of the invention, additional or different fields may be provided. The implementation of the status record described above is not limited to a single table, but also multiple related tables. The wafer lot identity field identifies the physical wafer lot, and may be expressed in letters and numbers. The current location field may also be expressed in letters and numbers. The current status field and the prior status field record current state and previous state of wafer lots respectively. Several status types may be used in both fields, such as waiting, in-process, on hold, lock hold release, and bank hold release, each in accordance with various events.

An example as shown in FIG. 2 is a diagram of an exemplary wafer lot status record according to an embodiment of the present invention. The illustrated status record includes four fields, wafer lot identity 21, current location 22, current status 23 and prior status 24. In this example, ten wafer lots are in process, with the wafer lot identity 21 ranging from 1 to 10 and the current location 22 all in A. Both the current status 23 and prior status 24 have several common status types, such as waiting, in-process, on hold, completed, and lot hold release.

Figure 4:
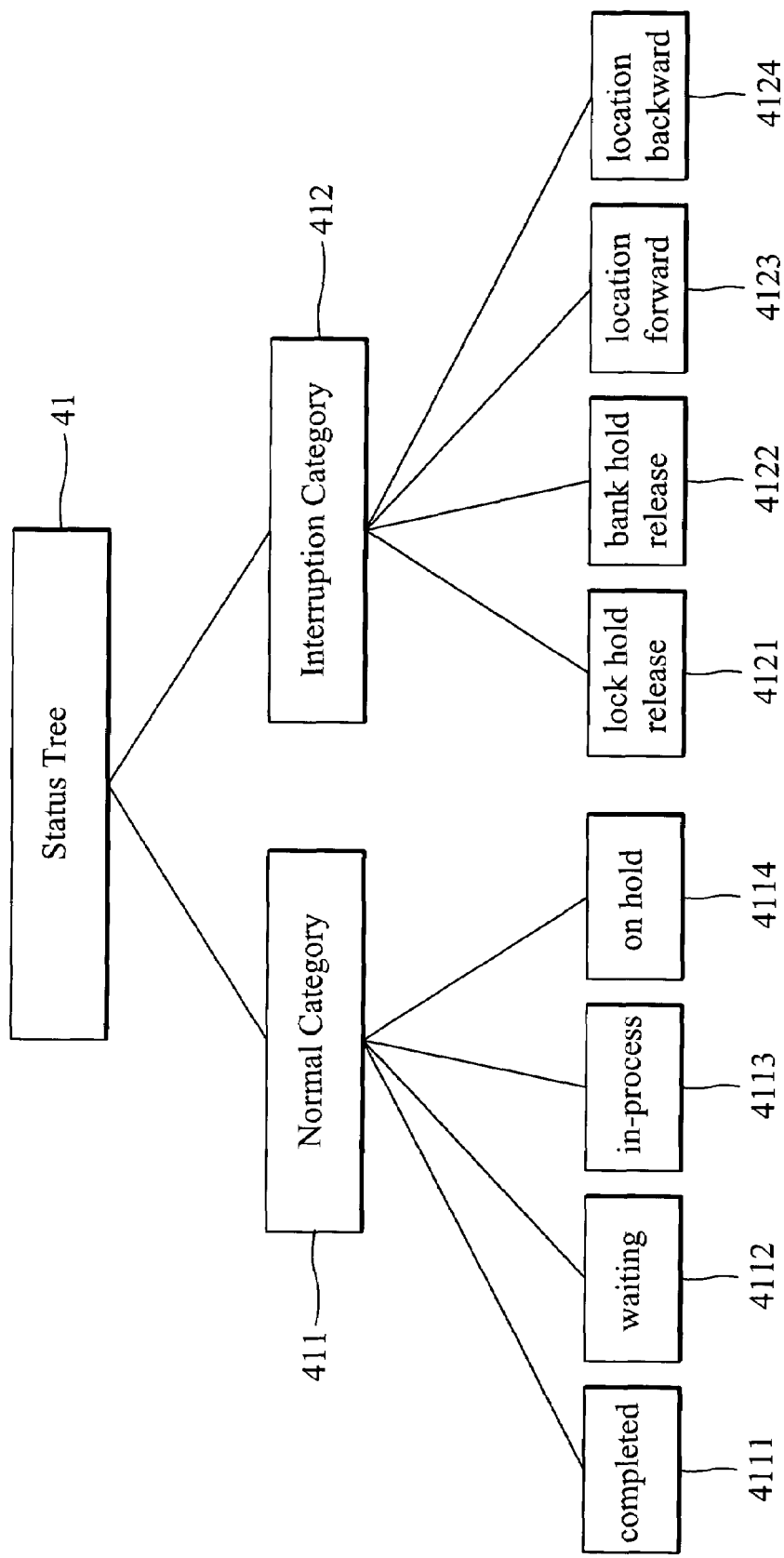
FIG. 4 is a diagram of an exemplary status tree according to an embodiment of the present invention.

The status storage 12 includes a status tree to store a plurality of status types and each status category includes a plurality of status types. The implementation of the status storage described above is not limited to memory, but also in any physical device, such as file, database, etc. FIG. 4 shows an example diagram of an exemplary status tree according to an embodiment of the present invention. According to the example, the status tree 41 includes two categories, normal 411 and interruption 412. Normal category 411 includes four status types, such as completed 4111, waiting 4112, in-process 4113 and on hold 4114. The interrupt category 412 includes four status types, such as lock hold release 4121, bank hold release 4122, location forward 4123 and location backward 4124. Referring to FIG. 2, prior status 24 of wafer lots 1, 2, and 3 is all in the interrupt category, representing that the previous operation was interrupted by the operator. Using the illustrated status tree separates whole statuses into two categories (normal category and interruption category) is essential for understanding whether a wafer lot is interrupted because of quality issues. Consistent with the scope and spirit of the invention, additional or different categories or fields may be provided.

The filtering rule base 13 stores filtering rules applied to candidate wafer lots not in the desired destinations. It is effective to trace the current status and previous operation in the record to determine if wafer lots are in the desired destinations. The filtering rule determines whether wafer lots are candidate wafer lots by ensuring that the current status 23 is waiting status and the prior status 24 is in the interrupt category 412.

The dispatch control unit 14 selects candidate wafer lots and initiates the transport unit 15 to transport candidate wafer lots to the desired destinations. First, it inputs status record from wafer lot status database 11 repeatedly for a period of time. The period of time may be set to a sufficient time (e.g., 15 minutes or half hour) to avoid seizing the entire automated transport system and crowding other commands. Wafer lots are selected using the filtering rule. The maximum number of candidate wafer lots is limited by the operator to avoid traffic conflicts. Then, the dispatch control unit 14 calculates the objective destination for each candidate wafer lot using tool dispatch rule considering the factor of WIP load balancing. Finally, transport commands for each candidate wafer lot are created and initiate the transport unit 15 to transport the candidate wafer lots to the desired destination.

Conventional transport unit 15 receives transport commands from dispatch control unit 14, and transports candidate wafer lots to desired destinations. Desired destinations can be stockers or equipment.

The conventional dispatch unit 16 provides various dispatch functions, such as tool dispatch rule or lot dispatch rule to calculate objective lots or desired destinations respectively.

Figure 3:
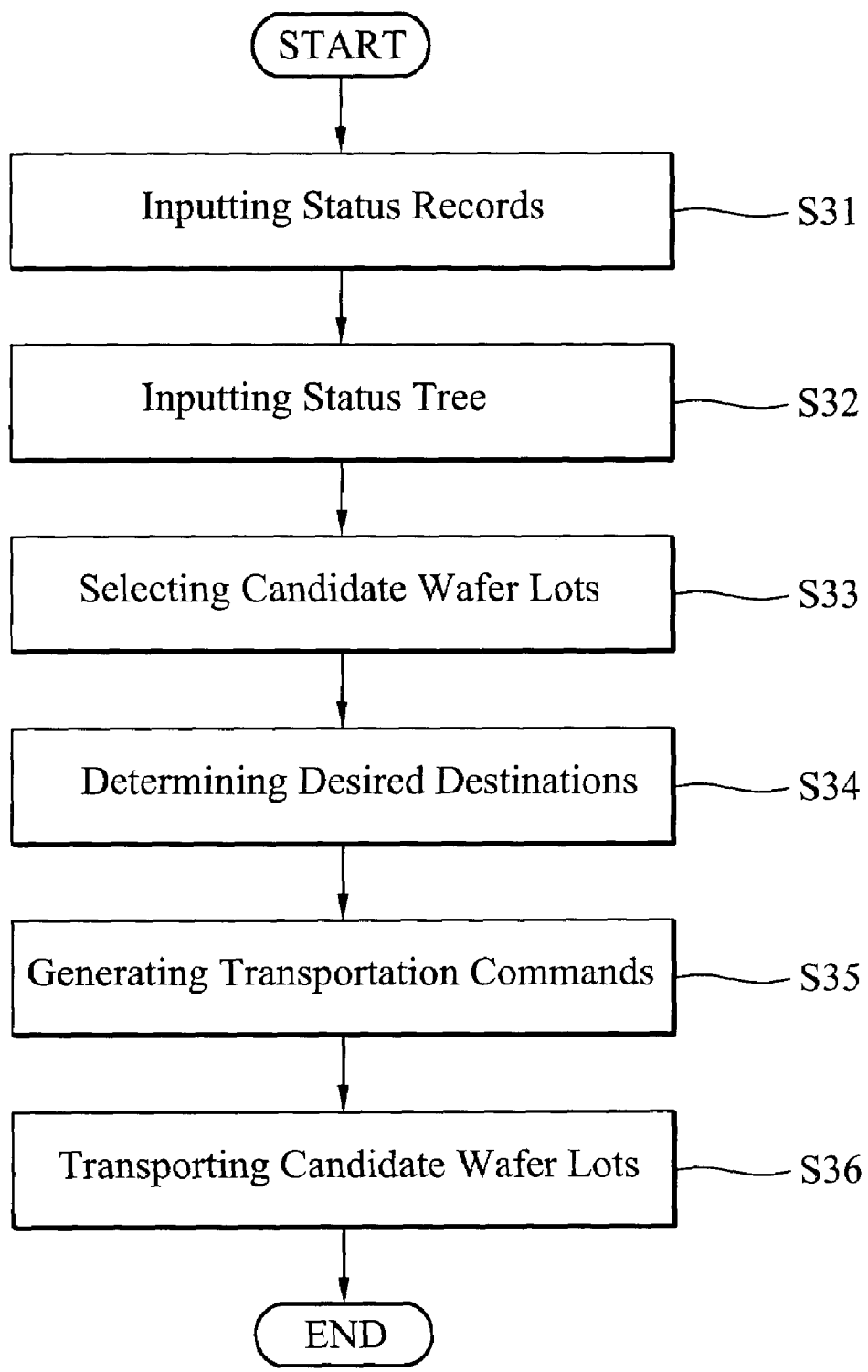
FIG. 3 is a flowchart showing a method of automated dispatch and transport of wafer lots.

FIG. 3 is a flowchart showing a method of automated dispatch and transport of wafer lots according to the present invention.

First, in step S31, status records are input from the wafer lot status database 11 by the dispatch control unit 14 repeatedly for a period of time. The period of time is sufficiently established by an operator to avoid traffic conflict. The status record preferably comprises four fields, such as wafer lot identity, current location, current status, and prior status. The wafer lot identity field and current location field may be expressed in letters and numbers. The current status field and the prior status field record current state and previous state of wafer lots respectively. An example is illustrated in FIG. 2. The illustrated status record includes four fields, such as wafer lot identity 21, current location 22, current status 23 and prior status 24. In this example, there are ten wafer lots in process, with the wafer lot identity 21 from 1 to 10 and the current location 22 all in A. Both the current status 13 and prior status 24 comprise several common status types, such as waiting, in-process, on hold, completed and lot hold release.

Then, in step S32, the dispatch control unit 14 inputs a status tree from the status storage 12. The status tree includes at least one interrupt category, which includes a plurality of status types, for example, lot hold release, bank hold release, location forward, location backward and operation branch. An example is shown in FIG. 4. According to the example, the status tree 41 includes two categories, normal 411 and interruption 412. The normal category 411 includes four status types, such as completed 4111, waiting 4112, in-process 4113 and on hold 4114. The interrupt category 412 includes four status types, such as lock hold release 4121, bank hold release 4122, location forward 4123 and location backward 4124. Referring to FIG. 2, the prior status 24 of wafer lots 1, 2, and 3 are all in the interrupt category, indicating, in the previous operation, interruption by operator.

In step S33, the dispatch control unit 14 selects wafer lots as candidate wafer lots using the filtering rule. The filtering rule determines whether the current status 23 is waiting status and the prior status 24 is in the interrupt category 412 of each wafer lot. The maximum number of candidate wafer lots is limited by the operator to avoid traffic conflicts.

In step S34, the dispatch control unit 14 calculates desired destinations for each candidate wafer lot using a tool dispatch rule considering the factor of WIP load balancing.

In step S35, the dispatch control unit 14 generates transport commands for candidate wafer lots to the transport unit 15.

Finally, in step S36, the transport unit 15 transports the candidate wafer lots to the desired destination according to the transport commands. Desired destinations can be stockers or equipment.

The system and method described effectively reduces transport time and improves equipment utilization, avoiding traffic conflicts.

Figure 5:
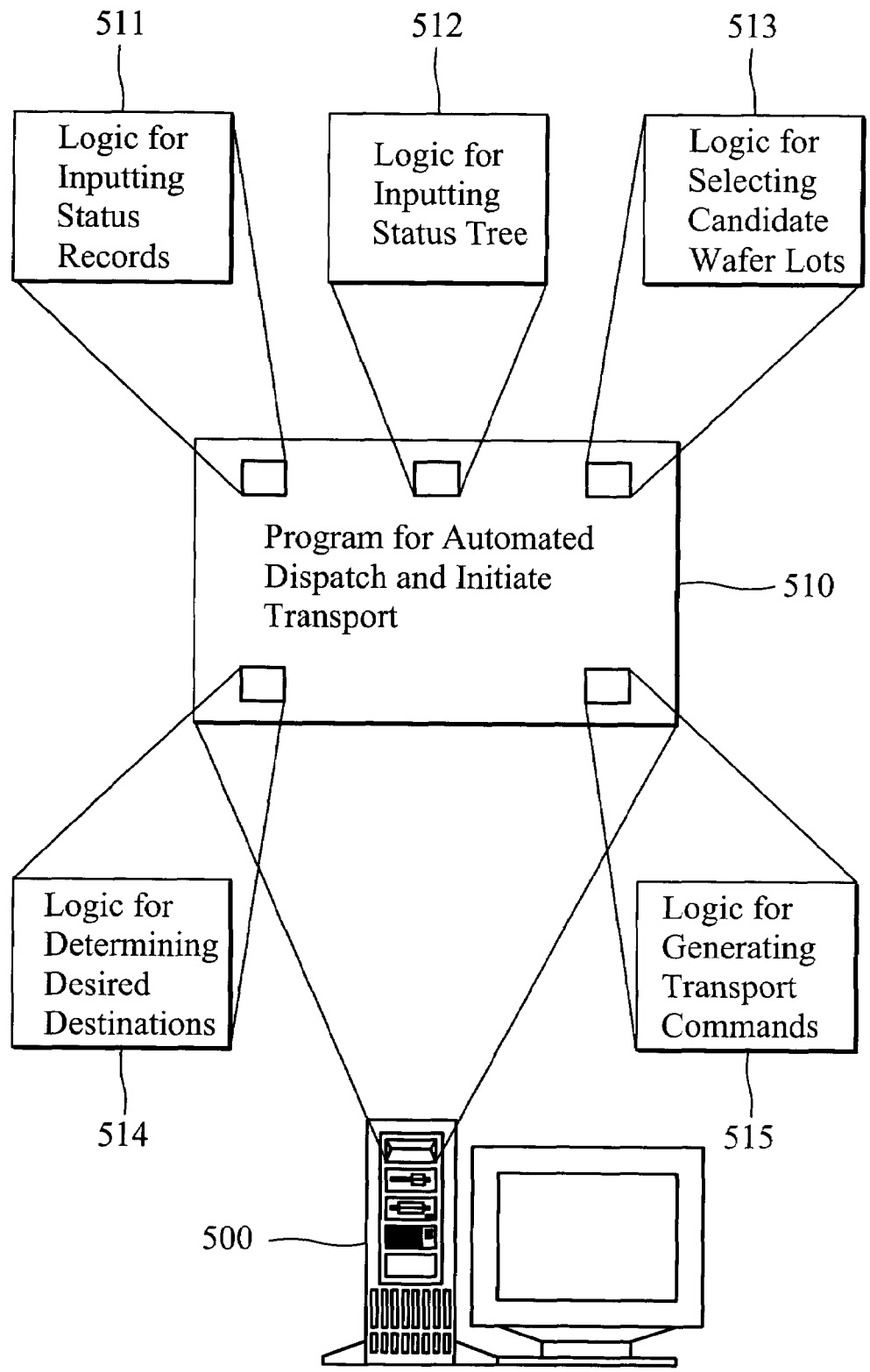
FIG. 5 is a diagram of a storage medium for storing a computer program providing a method of automated dispatch and transport of wafer lots.

In addition, the invention discloses a storage medium for storing a computer program providing the disclosed method of automated dispatch and transport of wafer lots, as shown in FIG. 5

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A computer executed system of transporting work-in-process (WIP) by creating a plurality of transport commands, comprising:
    a process database capable of storing a plurality of status records corresponding to the WIP, each status record comprising current location, current status and prior status;
    status storage, including a status tree, the status tree comprising an interrupt category comprising a plurality of status types;
    a filtering rule base to store a plurality of filtering rules, the filtering rule configured to select status records for dispatch; and
    a dispatch control unit, configured to repeatedly input the status record for a period of time, select a plurality of candidate WIP units from the status records using the filtering rule together with the status records, determine the desired destination for the selected candidate WIP, and create a plurality of transport commands to control the transport of WIP.

2. The system as claimed in claim 1 wherein the period of time is controllably defined by an operator.

3. The system as claimed in claim 1 wherein a rule within the filtering rule base determines whether the current status is a waiting state and the prior status is in an interrupt category.

4. The system as claimed in claim 1 wherein, in the dispatch control unit, an original location, prior to transport, is a stocker.

5. The system as claimed in claim 1 wherein, in the dispatch control unit, an original location, prior to transport, is an equipment installation.

6. The system as claimed in claim 1 wherein, in the dispatch control unit, the desired destination is the stocker.

7. The system as claimed in claim 1 wherein, in the dispatch control unit, the desired destination is an equipment installation.

8. The system as claimed in claim 1 wherein, in the dispatch control unit, the desired destinations are obtained by a tool dispatch rule.

9. The system as claimed in claim 8 wherein the tool dispatch rule is configured to consider WIP load balancing.

10. The system as claimed in claim 1 wherein, in the transport control unit, the total number of candidate WIP units is less than a maximum allowable amount, the maximum allowable amount controllably established by operator to avoid traffic conflict.

11. A method creating a plurality of transport commands to a transport system to transport a plurality of work-in-process (WIP) units, the method comprising:
    providing a computer to perform steps of:
    inputting a plurality of status records corresponding to the WIP, wherein each status record comprises a current status and a prior status;
    inputting a status tree, wherein the status tree comprises an interrupt category, the interrupt category further comprising a plurality of status types;
    selecting a plurality of candidate WIP units from the status records using a filtering rule;
    determining a desired destination for each candidate WIP unit;
    creating a plurality of transport commands for the candidate WIP units; and
    transporting the candidate WIP units to the desired destinations according to the transport commands.

12. The method as claimed in claim 11, wherein the period of time is controllably established by an operator.

13. The method as claimed in claim 11 wherein, in the step of selecting the candidate WIP units using a filtering rule, the filtering rule determines whether the current status is a waiting status and the prior status is in the interrupt category.

14. The method as claimed in claim 11 wherein, in the step of selecting the candidate WIP units, the total number of candidate WIP units is less than a maximum allowable number to avoid traffic conflicts.

15. The method as claimed in claim 11 wherein, in the step of determining the desired destinations, the desired destination is a stocker.

16. The method as claimed in claim 11 wherein, in the step of determining the desired destinations, the desired destination is an equipment installation.

17. The method as claimed in claim 11 wherein the step of determining the desired destination for each WIP unit uses a tool dispatch rule.

18. The method as claimed in claim 17 wherein the tool dispatch rule considers WIP load balancing.

19. The method as claimed in claim 11 wherein, in the step of transporting the WIP units, an original location, prior to transport, is a stocker.

20. The method as claimed in claim 11 wherein, in the step of transporting the WIP units, an original location, prior to transport, is an equipment installation.

21. A computer-readable storage medium for storing a computer program providing a method creating a plurality of transport commands to a transport system to transport a plurality of work-in-process (WIP) units, the method comprising using a computer to perform steps of:

inputting a plurality of status records corresponding to the WIP, wherein each status record comprises a current status and a prior status;

inputting a status tree, wherein the status tree comprises an interrupt category, the interrupt category further comprising a plurality of status types;

selecting a plurality of candidate WIP units from the status records using a filtering rule;

determining a desired destination for each candidate WIP unit;

creating a plurality of transport commands for the candidate WIP units; and transporting the candidate WIP units to the desired destinations according to the transport commands.

22. The storage medium as claimed in claim 21, wherein the period of time is controllably established by an operator.

23. The storage medium as claimed in claim 21 wherein, in the step of selecting the candidate WIP units using a filtering rule, the filtering rule determines whether the current status is a waiting status and the prior status is in the interrupt category.

24. The storage medium as claimed in claim 21 wherein, in the step of selecting the candidate WIP units, the total number of candidate WIP units is less than a maximum allowable amount to avoid traffic conflicts.

25. The storage medium as claimed in claim 21 wherein, in the step of determining the desired destinations, the desired destination is a stocker.

26. The storage medium as claimed in claim 21 wherein in the step of determining the desired destinations, the desired destination is an equipment installation.

27. The storage medium as claimed in claim 21 wherein the step of determining the desired destination for each WIP unit uses a tool dispatch rule.

28. The storage medium as claimed in claim 27 wherein the tool dispatch rule considers WIP load balancing.

29. The storage medium as claimed in claim 21 wherein, in the step of transporting the WIP units, an original location, prior to transport, is a stocker.

30. The storage medium as claimed in claim 21 wherein, in the step of transporting the WIP units, an original location, prior to transport, is an equipment installation.

31. The system as claimed in claim 1, wherein the prior status is in the interrupt category, indicating the previous operation of the WIP.

* * * * *